(12) United States Patent
Leem

(10) Patent No.: US 9,979,232 B2
(45) Date of Patent: May 22, 2018

(54) WIRELESS POWER DEVICE HAVING A FIRST COIL AND A SECOND COIL

(71) Applicant: LG INNOTEK CO., LTD., Seoul (KR)

(72) Inventor: Sung Hyun Leem, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 300 days.

(21) Appl. No.: 14/647,041

(22) PCT Filed: Dec. 6, 2013

(86) PCT No.: PCT/KR2013/011317
§ 371 (c)(1),
(2) Date: May 22, 2015

(87) PCT Pub. No.: WO2014/092405
PCT Pub. Date: Jun. 19, 2014

(65) Prior Publication Data
US 2015/0303705 A1    Oct. 22, 2015

(30) Foreign Application Priority Data
Dec. 13, 2012  (KR) .................. 10-2012-0145644

(51) Int. Cl.
| | |
|---|---|
| H02J 17/00 | (2006.01) |
| H02J 50/12 | (2016.01) |
| H02J 7/02 | (2016.01) |
| H02J 5/00 | (2016.01) |

(52) U.S. Cl.
CPC ............. *H02J 50/12* (2016.02); *H02J 5/005* (2013.01); *H02J 7/025* (2013.01); *H02J 17/00* (2013.01)

(58) Field of Classification Search
CPC .. H02J 5/005; H02J 17/00; H02J 7/02; H01Q 7/00
USPC .......................................................... 307/104
See application file for complete search history.

(56) References Cited

U.S. PATENT DOCUMENTS

| | | | | |
|---|---|---|---|---|
| 9,112,542 B2* | 8/2015 | Leem | ................... | H04B 5/0037 |
| 2006/0267684 A1 | 11/2006 | Ohnishi et al. | | |
| 2008/0048799 A1* | 2/2008 | Wang | .................... | H01P 1/2039 |
| | | | | 333/156 |
| 2008/0298100 A1* | 12/2008 | Esaka | ..................... | H01F 38/14 |
| | | | | 363/67 |
| 2012/0025605 A1* | 2/2012 | Schneider | ............... | B60L 5/005 |
| | | | | 307/9.1 |
| 2012/0049981 A1* | 3/2012 | Fukunaga | .......... | H01P 1/20327 |
| | | | | 333/204 |
| 2012/0119700 A1* | 5/2012 | Forsell | ............... | A61N 1/37229 |
| | | | | 320/108 |

(Continued)

*Primary Examiner* — Jared Fureman
*Assistant Examiner* — Michael Warmflash
(74) *Attorney, Agent, or Firm* — Birch, Stewart, Kolasch & Birch, LLP

(57) ABSTRACT

The invention relates to a wireless power device including a coil to wirelessly transmit or receive power. The coil has a meander pattern. And the quality factor can be increased by reducing the resistance component through the structure of the coil having the meander pattern. Also, the power transmission efficiency can be significantly improved by concentrating the intensity of the magnetic field on a predetermined part through the structure of the coil having the meander pattern.

7 Claims, 5 Drawing Sheets

(56) References Cited

U.S. PATENT DOCUMENTS

| | | | | |
|---|---|---|---|---|
| 2012/0188041 | A1* | 7/2012 | Kook | H02J 5/005 336/90 |
| 2012/0193996 | A1* | 8/2012 | Ryu | H01Q 1/38 307/104 |
| 2012/0217111 | A1* | 8/2012 | Boys | H01F 38/14 191/10 |
| 2012/0299594 | A1* | 11/2012 | Habara | G01R 33/34046 324/322 |
| 2013/0088089 | A1* | 4/2013 | Leem | H04B 5/0037 307/104 |
| 2013/0146671 | A1* | 6/2013 | Grieshofer | G06K 19/07794 235/492 |
| 2013/0154384 | A1* | 6/2013 | Nakamura | H01F 38/14 307/104 |
| 2013/0154385 | A1* | 6/2013 | Miwa | H02J 17/00 307/104 |

* cited by examiner

[Fig. 1]
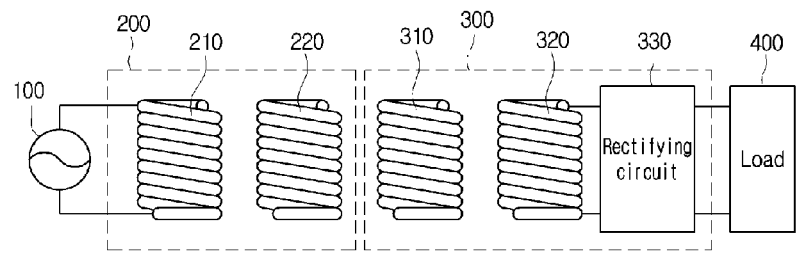
[Fig. 2]
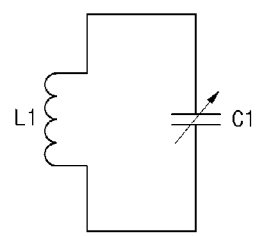
[Fig. 3]
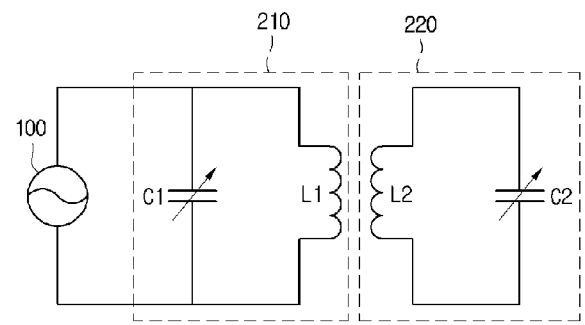
[Fig. 4]
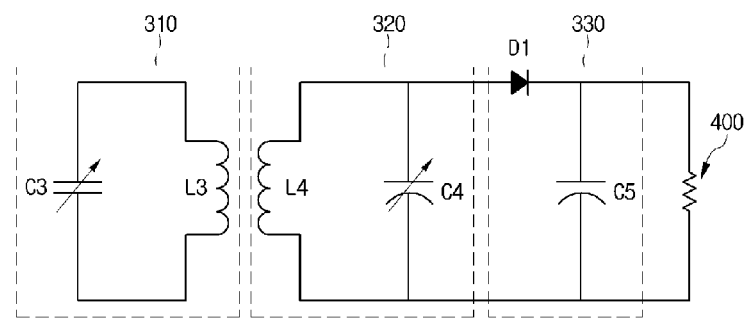

[Fig. 5]
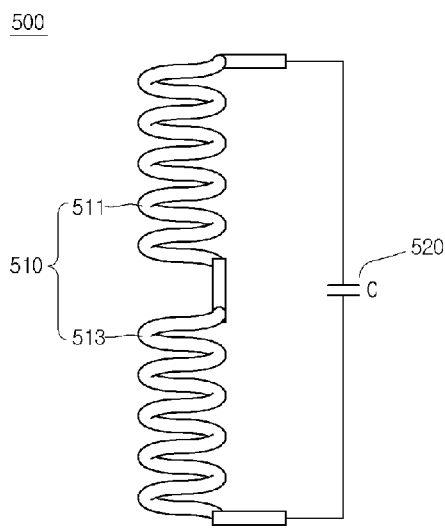
[Fig. 6]
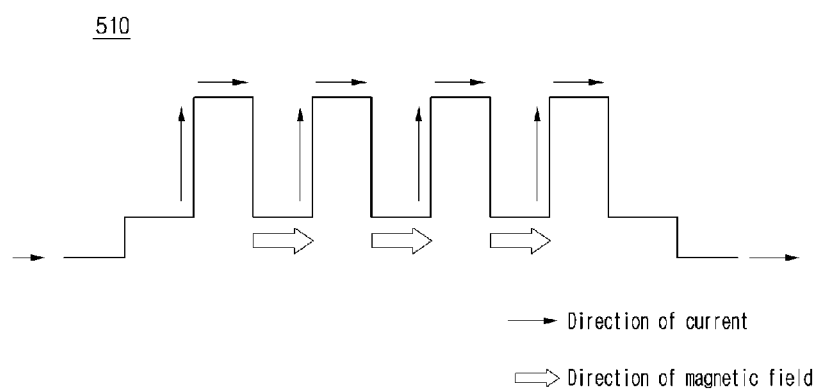
→ Direction of current
⇒ Direction of magnetic field
[Fig. 7]
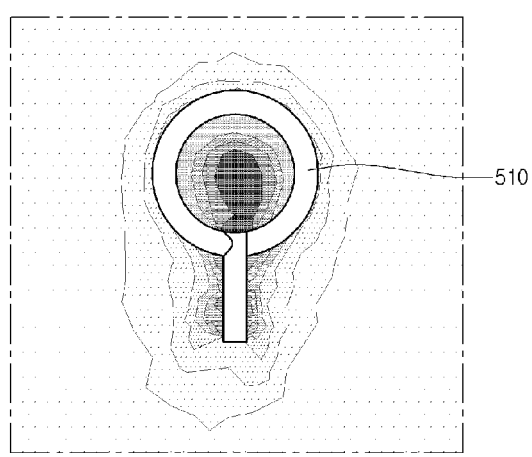

[Fig. 8]
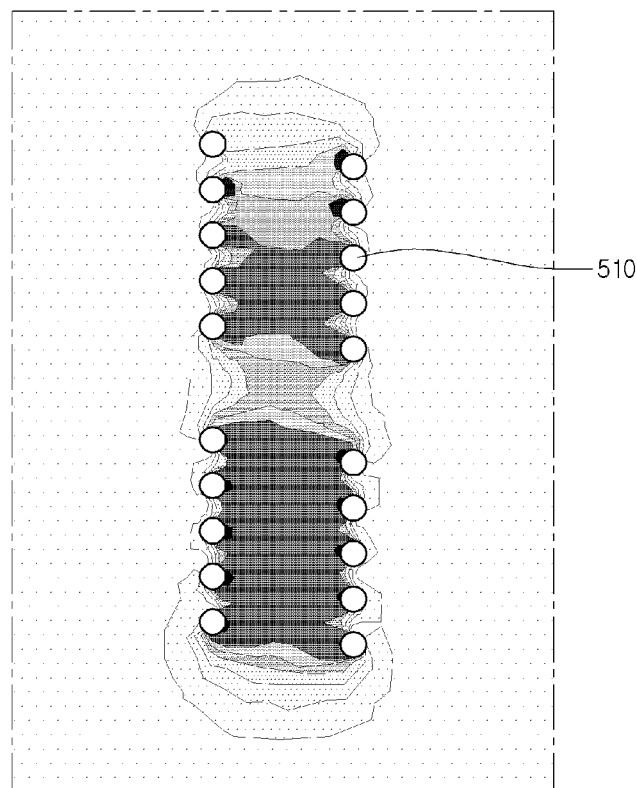
[Fig. 9]
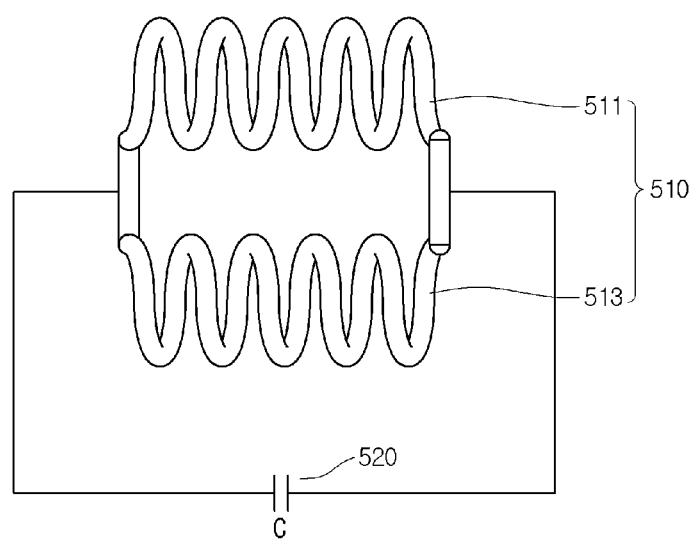

[Fig. 10]
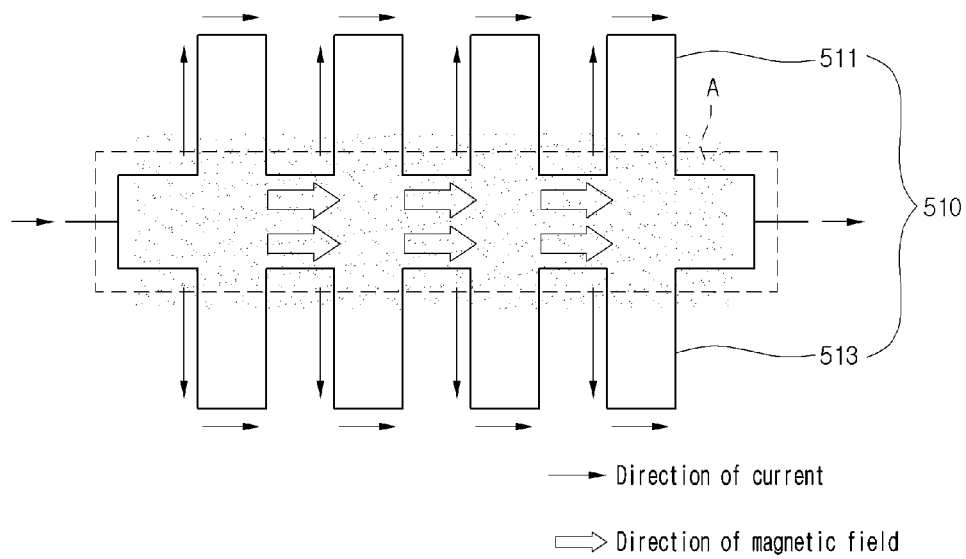
→ Direction of current
⇒ Direction of magnetic field
[Fig. 11]
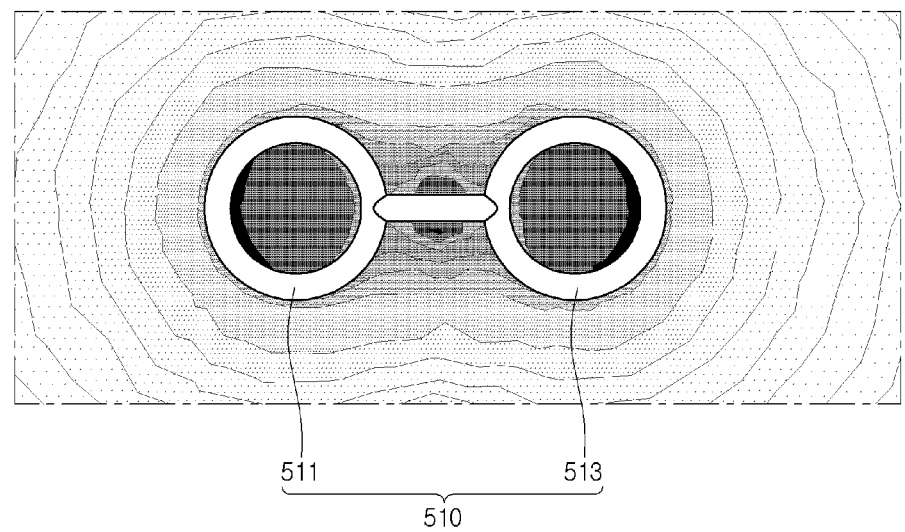

[Fig. 12]
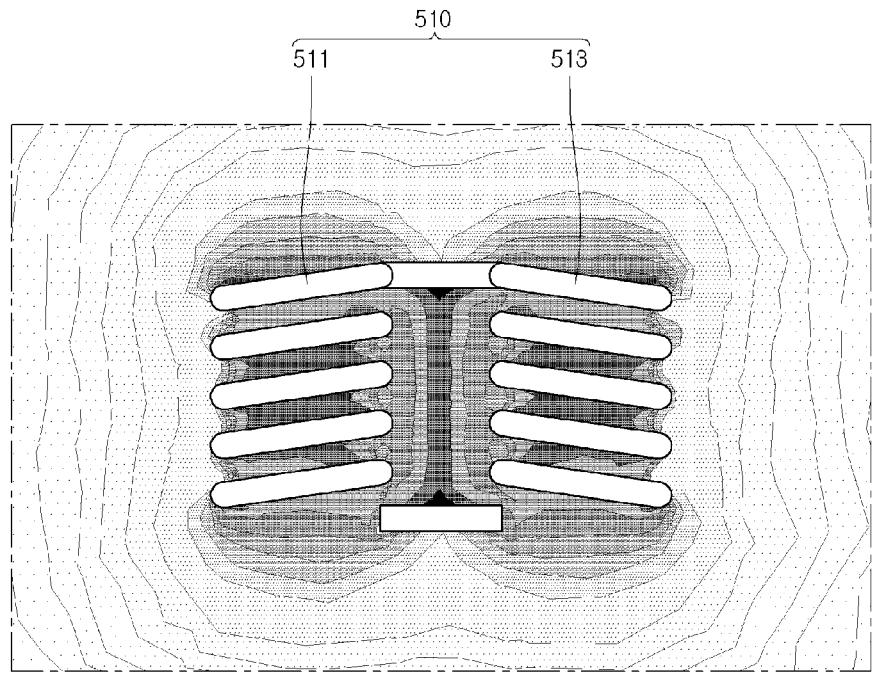
[Fig. 13]
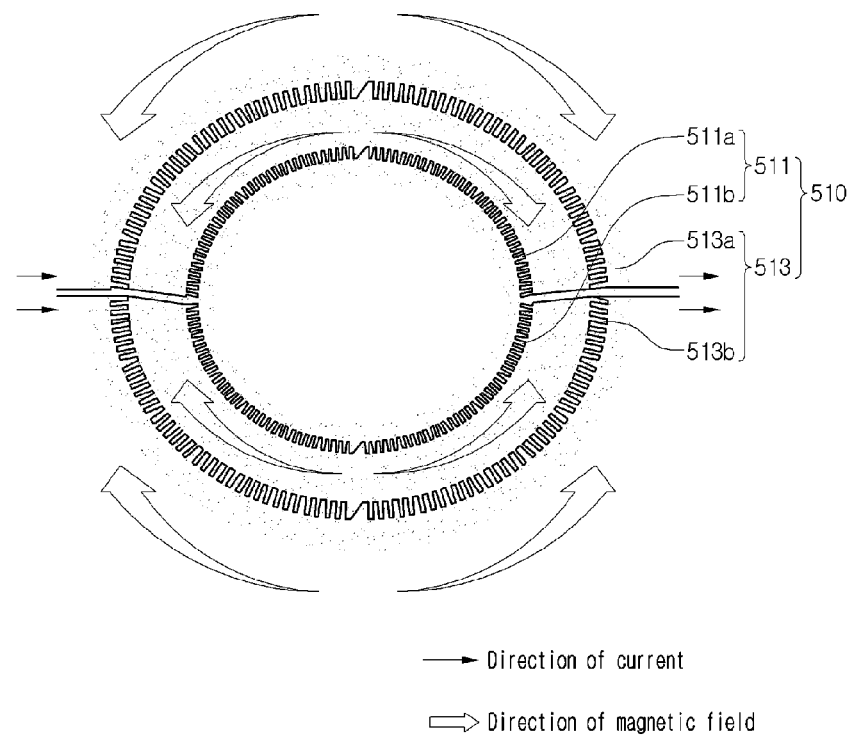

WIRELESS POWER DEVICE HAVING A FIRST COIL AND A SECOND COIL

TECHNICAL FIELD

The embodiment relates to a wireless power transmission technology.

BACKGROUND ART

A wireless power transmission or a wireless energy transfer refers to a technology of wirelessly transferring electric energy to desired devices. In the 1800's, an electric motor or a transformer employing the principle of electromagnetic induction has been extensively used and then a method for transmitting electrical energy by irradiating electromagnetic waves, such as radio waves or lasers, has been suggested. Actually, electrical toothbrushes or electrical razors, which are frequently used in daily life, are charged based on the principle of electromagnetic induction. The electromagnetic induction refers to a phenomenon in which a voltage is induced so that a current flows when a magnetic field is varied around a conductor. Although the commercialization of the electromagnetic induction technology has been rapidly progressed around small-size devices, the power transmission distance thereof is short.

Until now, the long-distance transmission using the electromagnetic induction, the resonance and the short-wavelength radio frequency has been used as the wireless energy transfer scheme.

Recently, an energy transfer scheme has been extensively used based on the electromagnetic induction or the resonance among wireless power transmission schemes.

According to the conventional energy transfers scheme based on the electromagnetic induction or the resonance, since a coil generally has a spiral structure or a helical structure, there is a limitation when increasing the power transmission efficiency.

As a related art, there is Korea Unexamined Patent Publication No. 10-2012-0116799.

DISCLOSURE OF INVENTION

Technical Problem

The embodiment provides a wireless power device capable of improving power transmission efficiency.

Solution to Problem

According to the embodiment, a wireless power device includes a coil to wirelessly transmit or receive power. The coil has a meander pattern.

According to the embodiment, a wireless power device includes a first coil and a second coil connected with the first coil. The first and second coils have a meander pattern. The first and second coils wirelessly transmit or receive power.

Advantageous Effects of Invention

As described above, according to the embodiment, the quality factor can be increased by reducing the resistance component through the structure of the coil having the meander pattern.

According to the embodiment, the power transmission efficiency can be significantly improved by concentrating the intensity of the magnetic field on a predetermined part through the structure of the coil having the meander pattern.

Meanwhile, any other various effects will be directly and implicitly described below in the description of the embodiment.

BRIEF DESCRIPTION OF DRAWINGS

FIG. 1 is a circuit diagram to explain the structure of a wireless power transmission system according to the embodiment.

FIG. 2 is a circuit diagram showing an equivalent circuit of a transmission induction coil according to the embodiment.

FIG. 3 is a circuit diagram showing an equivalent circuit of a power supply device and a wireless power transmitter according to the embodiment.

FIG. 4 is a circuit diagram showing an equivalent circuit of a wireless power receiver according to the embodiment.

FIG. 5 is a view to explain the structure of a wireless power device according to the first embodiment.

FIG. 6 is a view to explain the direction of a magnetic field generated according to a current flowing through a wireless power device according to the first embodiment.

FIG. 7 is a plan view showing an H-field representing the distribution of a magnetic field formed around the wireless power device according to the first embodiment.

FIG. 8 is a front view showing an H-field representing the distribution of the magnetic field formed around the wireless power device according to the first embodiment.

FIG. 9 is a view to explain the structure of a wireless power device according to a second embodiment.

FIG. 10 is a view to explain the direction of a magnetic field generated according to a current flowing through the wireless power device according to the second embodiment.

FIG. 11 is a plan view showing an H-field representing the distribution of a magnetic field formed around the wireless power device according to the second embodiment.

FIG. 12 is a front view showing an H-field representing the distribution of the magnetic field formed around the wireless power device according to the second embodiment.

FIG. 13 is a view showing the structure of a wireless power device according to a third embodiment.

BEST MODE FOR CARRYING OUT THE INVENTION

In the description of the embodiments, it will be understood that, when a layer (or film), a region, a pattern, or a structure is referred to as being "on" or "under" another substrate, another layer (or film), another region, another pad, or another pattern, it can be "directly" or "indirectly" over the other substrate, layer (or film), region, pad, or pattern, or one or more intervening layers may also be present. Such a position of the layer has been described with reference to the drawings.

Hereinafter, the embodiment will be described with reference to accompanying drawings. The thickness and size of each layer shown in the drawings may be exaggerated, omitted or schematically drawn for the purpose of convenience or clarity. In addition, the size of elements does not utterly reflect an actual size.

The embodiment to be described below can be easily realized by those skilled in the art.

FIG. 1 is a circuit diagram to explain the structure of a wireless power transmission system according to the embodiment.

Referring to FIG. 1, a wireless power transmission system may include a power supply device 100, a wireless power transmitter 200, a wireless power receiver 300 and a load 400.

The power supply device 100 according to the embodiment may be included in the wireless power transmitter 200.

The wireless power transmitter 200 may include a transmission induction coil 210 and a transmission resonant coil 220.

The wireless power receiver 300 may include a reception resonant coil 310, a reception induction coil 320 and a rectifying circuit 330.

Both terminals of the power supply device 100 are connected to both terminals of the transmission induction coil 210.

The transmission resonant coil 220 may be spaced apart from the transmission induction coil 210 by a predetermined distance.

The reception resonant coil 310 may be spaced apart from the reception induction coil 320 by a predetermined distance.

Both terminals of the reception induction coil 320 are connected to both terminals of the rectifying circuit 330, and the load 400 is connected to both terminals of the rectifying circuit 330. According to an embodiment, the load 400 may be included in the wireless power receiver 300.

The power generated from the power supply device 100 is transmitted to the wireless power transmitter 200. The power received in the wireless power transmitter 200 is transmitted to the wireless power receiver 300 that makes resonance with the wireless power transmitter 200 due to a resonance phenomenon, that is, has the resonance frequency the same as that of the wireless power transmitter 200.

Hereinafter, the power transmission process will be described in more detail.

The power supply device 100 generates AC power having a predetermined frequency and transmits the AC power to the wireless power transmitter 200.

The transmission induction coil 210 and the transmission resonant coil 220 are inductively coupled with each other. In other words, if AC current flows through the transmission induction coil 210 due to the power received from the power supply apparatus 100, the AC current is induced to the transmission resonant coil 220 physically spaced apart from the transmission induction coil 210 due to the electromagnetic induction.

Thereafter, the power received in the transmission resonant coil 220 is transmitted to the wireless power receiver 300, which makes a resonance circuit with the wireless power transmitter 200, through resonance.

Power can be transmitted between two LC circuits, which are impedance-matched with each other, that is, between the wireless power transmitter 200 and the wireless power receiver 300 through resonance. The power transmitted through the resonance can be farther transmitted with higher efficiency when comparing with the power transmitted through the electromagnetic induction.

The reception resonant coil 310 receives power from the transmission resonant coil 220 through the resonance. The AC current flows through the reception resonant coil 310 due to the received power. The power received in the reception resonant coil 310 is transmitted to the reception induction coil 320, which is inductively coupled with the reception resonant coil 310, due to the electromagnetic induction. The power received in the reception induction coil 320 is rectified by the rectifying circuit 330 and transmitted to the load 400.

According to the embodiment, the transmission induction coil 210, the transmission resonant coil 220, the reception resonant coil 310, and the reception induction coil 320 may have the shape such as a circular shape, an oval shape, or a square shape, but the embodiment is not limited thereto.

The transmission resonant coil 220 of the wireless power transmitter 200 may transmit power to the reception resonant coil 310 of the wireless power receiver 300 through a magnetic field.

In detail, the transmission resonant coil 220 and the reception resonant coil 310 are coupled with each other through resonance to operate at a resonance frequency.

As the transmission resonant coil 220 and the reception resonant coil 310 are coupled with each other through resonance, the power transmission efficiency between the wireless power transmitter 200 and the wireless power receiver 300 can be significantly improved.

According to the embodiment, if the wireless power transmission system performs power transmission based on the electromagnetic induction scheme, the wireless power transmitter 200 does not include the transmission resonant coil 220, and the wireless power receiver 300 does not include the reception resonant coil 310.

A quality factor and a coupling coefficient are important in the wireless power transmission. That is, as the quality factor and the coupling coefficient have greater values, the power transmission efficiency may be more improved.

The quality factor may refer to an index of energy that may be stored in the vicinity of the wireless power transmitter 200 or the wireless power receiver 300.

The quality factor may vary according to the operating frequency w as well as a shape, a dimension and a material of a coil. The quality factor may be expressed as an equation, $Q=\omega*L/R$. In the above equation, L refers to the inductance of thee coil and R refers to resistance corresponding to the quantity of power loss caused in the coil.

The quality factor may have a value of 0 to infinity. As the quality factor has a greater value, the power transmission efficiency between the wireless power transmitter 200 and the wireless power receiver 300 may be more improved.

The coupling coefficient represents the degree of inductive magnetic coupling between a transmission coil and a reception coil, and has a value of 0 to 1.

The coupling coefficient may vary according to the relative position and the distance between the transmission coil and the reception coil.

FIG. 2 is a circuit diagram showing an equivalent circuit of the transmission induction coil 210 according to the embodiment.

As shown in FIG. 2, the transmission induction coil 210 may include an inductor L1 and a capacitor C1, and a circuit having an appropriate inductance and an appropriate capacitance is configured through the inductor L1 and the capacitor C1.

The transmission induction coil 210 may have an equivalent circuit in which both terminals of the inductor L1 are connected with both terminals of the capacitor C1. In other words, the transmission induction coil 210 may have an equivalent circuit in which the inductor L1 and the capacitor C1 are connected with each other in parallel.

The capacitor C1 may include a variable capacitor, and the impedance matching may be performed as the capacitance of the capacitor C1 is adjusted. The equivalent circuits of the transmission resonant coil 220, the reception resonant coil 310, and the reception induction coil 320 may have the same as the circuit shown in FIG. 2.

FIG. 3 is a circuit diagram showing an equivalent circuit of the power supply device 100 and the wireless power transmitter 200 according to the embodiment.

As shown in FIG. 3, the transmission induction coil 210 may include the inductor L1 having a predetermined inductance and the capacitor C1 having a predetermined capacitance. The transmission resonant coil 220 may include an inductor L2 having a predetermined inductance and a capacitor C2 having a predetermined capacitance.

FIG. 4 is a circuit diagram showing an equivalent circuit of the wireless power receiver 300 according to the embodiment.

As shown in FIG. 4, the reception resonant coil 310 may include an inductor L3 having a predetermined inductance and a capacitor C3 having a predetermined capacitance. The reception induction coil 320 may include an inductor L4 having a predetermined inductance and a capacitor C4 having a predetermined capacitance.

The rectifying circuit 330 may convert AC power transferred from the reception induction coil 320 into DC power and may transfer the DC power to the load 400.

The rectifying circuit 330 may include a rectifier and a smoothing circuit. According to the embodiment, the rectifier may include a silicon rectifier and may be equivalent to a diode D1 as shown in FIG. 4.

The rectifier may convert AC power transferred from the reception induction coil 320 into DC power.

The smoothing circuit may remove AC components included in the DC power converted by the rectifier to output a smoothed DC power. According to an embodiment, as shown in FIG. 4, a rectifying capacitor C5 may be used as the smoothing circuit, but the embodiment is not limited thereto.

The load 400 may be an arbitrary rechargeable battery or a device requiring the DC power. For example, the load 400 may refer to a battery.

The wireless power receiver 300 may be installed in an electronic appliance, such as a cellular phone, a laptop computer or a mouse, requiring the power. Accordingly, the reception resonant coil 310 and the reception induction coil 320 may have the shapes appropriate for the shape of the electronic appliance.

The wireless power transmitter 200 may exchange information with the wireless power receiver 300 through in-band or out-of-band communication.

The in-band communication may refer to the communication for exchanging information between the wireless power transmitter 200 and the wireless power receiver 300 by using a signal having a frequency used in the wireless power transmission. The wireless power receiver 300 may further include a switch and may receive the power transmitted from the wireless power transmitter 200 through a switching operation of the switch or not. Thus, the wireless power transmitter 200 detects the quantity of power consumed in the wireless power transmitter 200, so that the wireless power transmitter 200 may recognize an on or off signal of the switch included therein.

In detail, the wireless power receiver 300 may change the quantity of power dissipated in a resistor by using the resistor and a switch, so that the power consumed in the wireless power transmitter 200 may be changed. The wireless power transmitter 200 may sense a change of the dissipated power to obtain information about a state of the wireless power receiver 300. The switch and the resistor may be connected in series to each other. The information about a state of the wireless power receiver 300 may include information about a current charged quantity and/or the change of charged quantity of the wireless power receiver 300.

In more detail, when the switch is opened, the power dissipated in the resistor is 0 (zero) and the power consumed in the wireless power transmitter 200 is also reduced.

If the switch is shorted, the power dissipated in the resistor is more than 0 and the power consumed in the wireless power transmitter 200 is increased. While the wireless power receiver repeats the above operation, the wireless power transmitter 200 may detect the power consumed in the wireless power transmitter 200 and may perform digital communication with the wireless power receiver 300.

The wireless power transmitter 200 receives the information about the state of the wireless power receiver 300 according to the above operation, so that the wireless power transmitter 200 may transmit the power appropriate to the reception state of the wireless power receiver 300.

To the contrary, the wireless power transmitter 200 may include a resistor and a switch to transmit the information about the state of the wireless power transmitter 200 to the wireless power receiver 300. According to one embodiment, the information about the state of the wireless power transmitter 200 may include information about the maximum quantity of power to be supplied from the wireless power transmitter 200, the number of wireless power receivers 300 receiving the power from the wireless power transmitter 200 and the quantity of available power of the wireless power transmitter 200.

The out-of-band communication refers to the communication performed through a specific frequency band other than the resonance frequency band in order to exchange information necessary for the power transmission. The wireless power transmitter 200 and the wireless power receiver 300 can be equipped with out-of-band communication modules to exchange information necessary for the power transmission. The out-of-band communication module may be installed in the power supply device. In one embodiment, the out-of-band communication module may use a short-distance communication technology, such as Bluetooth, Zigbee, WLAN or NFC, but the embodiment is not limited thereto.

Hereinafter, wireless power devices according to various embodiments will be described with reference to FIGS. 5 to 13 in association with the description of FIGS. 1 to 4.

The description of the wireless power device according to the first embodiment will be made below with reference to FIGS. 5 to 8.

FIG. 5 is a view to explain the structure of a wireless power device according to the first embodiment. FIG. 6 is a view to explain the direction of a magnetic field generated according to a current flowing through a wireless power device according to the first embodiment. FIG. 7 is a plan view showing an H-field representing the distribution of a magnetic field formed around the wireless power device according to the first embodiment. FIG. 8 is a front view showing an H-field representing the distribution of the magnetic field formed around the wireless power device according to the first embodiment.

Referring to FIG. 5, the wireless power device according to the first embodiment may include a coil 510 and a capacitor 520. One terminal of the coil 510 is connected with one terminal of the capacitor 520, and an opposite terminal of the coil 510 is connected with an opposite terminal of the capacitor 520.

The coil 510 may wirelessly transmit or receive power.

According to the embodiment, when the coil 510 performs power transmission/reception by using an electromagnetic induction scheme, the coil 510 may correspond to the transmission induction coil 210 or the reception induction coil 320 described with reference to FIGS. 1 to 4. In this case, the wireless power device 500 may not include the capacitor 520.

According to the embodiment, when the coil 510 performs power transmission/reception by using a resonance scheme, the coil 510 may correspond to the transmission resonant coil 220 or the reception resonant coil 320 described with reference to FIGS. 1 to 4.

The coil 510 may include a first coil 511 and a second coil 513. The first coil 511 and the second coil 513 may be connected with each other in series. In other words, one terminal of the first coil 511 is connected with the one terminal of the capacitor 520, and an opposite terminal of the first coil 511 is connected with one terminal of the second coil 513. An opposite terminal of the second coil 513 is connected with the opposite terminal of the capacitor 520.

In FIG. 5, the coil 510 includes two coils for an illustrative purpose.

According to the embodiment, at least one of the first and second coils 511 and 513 may have a meander pattern. The meander pattern may have a winding or crooked structure in which one conductive line is wound, but the embodiment is not limited thereto. In other words, the meander pattern may refer to various patterns including a pattern in which one conductive line has the repeated S-shape structure.

When a current flows through the first and second coils 511 and 513 having the meander pattern, a strong magnetic field may be formed in the coil 510. As shown in FIG. 6, the coil 510 having the first and second coils 511 and 513 connected in series has a meander pattern. If the current is applied to the one terminal of the coil 510, the current flows through the coil 510 having the meander pattern, and a magnetic field is generated in a direction of surrounding the direction of a current flow according to Ampere s right hand screw rule.

Hereinafter, the distribution of the magnetic field formed around the coil 510 will be made in detail with reference to FIGS. 7 and 8.

Referring to FIGS. 7 and 8, the distribution of the magnetic field formed around the wireless power device 500 according to the first embodiment is shown.

The simulation results of FIGS. 7 and 8 show the distribution of the magnetic field obtained through an experiment using an electromagnetic induction scheme, and the use frequency of 13.56 MHz. The H-fields of FIGS. 7 and 8 show that a magnetic field is mainly formed in the coil 510, and the weak intensity of the magnetic field can be found around the coil 510.

Referring to FIG. 5 again, when the wireless power device 50 transceives power by using the resonance scheme, the capacitor 520 adjusts the resonance frequency. In this case, the capacitor 520 may include a variable capacitor, and a control unit of the wireless power device 500 may adjust the resonance frequency by changing the capacitance of the capacitor 520.

Hereinafter, a wireless power device according to a second embodiment will be described with reference to FIGS. 9 to 12.

FIG. 9 is a view to explain the structure of a wireless power device according to a second embodiment. FIG. 10 is a view to explain the direction of a magnetic field generated according to a current flowing through the wireless power device according to the second embodiment. FIG. 11 is a plan view showing an H-field representing the distribution of a magnetic field formed around the wireless power device according to the second embodiment. FIG. 12 is a front view showing an H-field representing the distribution of the magnetic field formed around the wireless power device according to the second embodiment.

Referring to FIG. 9, the wireless power device according to the second embodiment may include the coil 510 and the capacitor 520.

Since the capacitor 520 is the same as that described with reference to FIG. 5, the details thereof will be omitted.

The coil 510 may be connected with the capacitor 520 in parallel.

The coil 510 may wirelessly transmit or receive power.

According to the embodiment, when the coil 510 performs power transmission/reception by using an electromagnetic induction scheme, the coil 510 may correspond to the transmission induction coil 210 or the reception induction coil 320 described with reference to FIGS. 1 to 4. In this case, the wireless power device 500 may not include the capacitor 520.

According to the embodiment, when the coil 510 performs power transmission/reception by using a resonance scheme, the coil 510 may correspond to the transmission resonant coil 220 or the reception resonant coil 320 described with reference to FIGS. 1 to 4.

The coil 510 may include the first and second coils 511 and 513. The first and second coils 511 and 513 may be connected with each other in parallel, and each of the first and second coils 511 and 513 may be connected with the capacitor 520 in parallel. In other words, the one terminal of the first coil 511 may be connected with the one terminal of the second coil 513, and the opposite terminal of the first coil 511 may be connected with the opposite terminal of the second coil 513. The one terminal of the capacitor 520 is connected with the one terminal of the first coil 511 and the one terminal of the second coil 513, and the opposite terminal of the capacitor 520 may be connected with the opposite terminal of the first coil 511 and the opposite terminal of the second coil 513.

The first and second coils 511 and 513 have a meander pattern as described with reference to FIG. 5. When current flows through the first and second coils 511 and 513 having the meander pattern, a strong magnetic field may be formed between the first and second coils 511 and 513, so that the power transmission efficiency can be significantly improved. The detail thereof will be made with reference to FIG. 10.

Referring to FIG. 10, the first and second coils 511 and 513 having the meander pattern are connected with each other in parallel to form a meander pattern having a parallel structure. When current is applied to the coil 510 so that the current flows through the first and second coils 511 and 513, a magnetic field is generated in a direction of surrounding the direction of a current flow according to Ampere s right hand screw rule.

In this case, magnetic fields, which are horizontally directed, are superimposed on each other at an area A between the first and second coils 511 and 513 so that a strong magnetic field can be formed. If the wireless power device 500 according to the second embodiment wirelessly receives power, and the wireless power receiver 300 (FIG. 1) is interposed between the first and second coils 511 and 513, the intensity of the magnetic field sent to the wireless power receiver is increased, so that the power transmission efficiency can be significantly improved.

The above effects will be further examined by making reference to the simulation results of FIGS. 11 and 12.

The simulation results of FIGS. 11 and 12 show the distribution of the magnetic field obtained through an experiment using an electromagnetic induction scheme, and the use frequency of 13.56 MHz. The H-fields of FIGS. 11 and 12 show that the strong intensity of a magnetic field is formed in the coil 510, and particularly, the strong magnetic field is formed between the first and second coils 511 and 513. In other words, differently form the simulation results of FIGS. 7 and 8 for the first and second coils 511 and 513 connected with each other in series, a stronger magnetic field is not only generated in the first and second coils 511 and 513, but also between the first and second coils 511 and 513

As shown in FIG. 10, if the wireless power device 500 according to the second embodiment wirelessly receives power, and the wireless power receiver is located between the first coil 511 and the second coil 513, the intensity of the magnetic field transmitted to the wireless power receiver is increased, so that the power transmission efficiency can be greatly improved.

Further, in the wireless power device 500 according to the second embodiment, since two coils having the meander pattern are connected with each other in parallel, the resistance components of the coils have the effects the same as those of a parallel-connection structure thereof, so that a quality factor (Q) can be greatly improved.

In detail, the quality factor Q may be calculated through an equation Q=ω*L/R in which w refers to a frequency used in the wireless power transmission, R refers to a resistance component of the coil, and L refers to the inductance of the coil. As the value of R is decreased, the quality factor Q can be improved.

Hereinafter, the wireless power device according to a third embodiment will be described with reference to FIG. 13.

FIG. 13 is a view showing the structure of the wireless power device according to the third embodiment.

A wireless power device shown in FIG. 13 has a structure in which two parallel-structure coils 510 described with reference to FIGS. 9 to 12 are arranged.

Referring to FIG. 13, the wireless power device according to the third embodiment may include two coils 510 and the capacitor 520.

Since the capacitor 520 is the same as that described with reference to FIG. 5, the details thereof will be omitted.

The coil 510 may wirelessly transmit or receive power.

According to the embodiment, when the coil 510 performs power transmission/reception by using an electromagnetic induction scheme, the coil 510 may correspond to the transmission induction coil 210 or the reception induction coil 320 described with reference to FIGS. 1 to 4. In this case, the wireless power device 500 may not include the capacitor 520.

According to the embodiment, when the coil 510 performs power transmission/reception by using a resonance scheme, the coil 510 may correspond to the transmission resonant coil 220 or the reception resonant coil 320 described with reference to FIGS. 1 to 4.

The coil 510 may include the first coil 511 and the second coil 513, and the first and second coils 511 and 513 may be connected with each other in parallel. In other words, the one terminal of the first coil 511 may be connected with the one terminal of the second coil 513, and the opposite terminal of the first coil 511 may be connected with the opposite terminal of the second coil 513. The first coil 511 may include first and second sub-coils 511a and 511b. The first and second sub-coils 511a and 511b may have a closed-loop structure. For example, the first and second sub-coils 511a and 511b may have an oval structure or a circular structure. The first and second sub-coils 511a and 511b may be connected with each other in parallel.

The second coil 513 may include a first sub-coil 513a and a second sub-coil 513b. The first and second sub-coils 513a and 513b may have a closed-loop structure. For example, the first and second sub-coils may have an oval structure or a circular structure. The first and second sub-coils 513a and 513b may be connected with each other in parallel.

The second coil 13 may be provided around the first coil 511. In other words, the second coil 513 may surround the first coil 511, and have the same shape as that of the first coil 511, have different diameter with each other, but the embodiment is not limited thereto.

For example, the first sub-coil 511a of the first coil 511 may be symmetrical to the second sub-coil 511b of the first coil 511 about a virtual horizontal line. For example, the first sub-coil 513a of the second coil 513 may be symmetrical to the second sub-coil 513b of the second coil 513 about the virtual horizontal line.

For example, the first sub-coil 511a of the first coil 511 may have substantially the same spacing as that of the first sub-coil 513a of the second coil 513, but the embodiment is not limited thereto. For example, the second sub-coil 511b of the first coil 511 may have substantially the same spacing as that of the second sub-coil 513b of the second coil 513, but the embodiment is not limited thereto.

For example, the first sub-coil 511a of the first coil 511 may be connected with the first sub-coil 513a of the second coil 513 in parallel. For example, the second sub-coil 511b of the first coil 511 may be connected with the second sub-coil 513b of the second coil 513 in parallel.

The first and second coils 511 and 513 of the coil 510, that is, each of the first sub-coil 511a, the first sub coil 513a, the second sub-coil 511b, and the second sub-coil 513b may have a meander pattern.

The curvature radius of the second coil 513 may be greater than the curvature radius of the first coil 511. For example, the curvature radius of the first sub-coil 513a of the second coil 513 may be greater than the curvature radius of the first sub-coil 511a of the first coil 511. For example, the curvature radius of the second sub-coil 513b of the second coil 513 may be greater than the curvature radius of the second sub-coil 511b of the first coil 511.

In the wireless power device 500 according to the third embodiment shown in FIG. 13, each of the first and second coils 511 and 513 having the parallel structure described in FIGS. 9 to 12 is provided in a closed-loop structure.

When current flows through the first and second coils 511 and 513 having the meander pattern, a strong magnetic field may be formed in a horizontal direction between the first and second coils 511 and 513, identically to the direction of the magnetic field shown in FIG. 13. If the wireless power device 500 according to the third embodiment wirelessly receives power, and the wireless power receiver 300 is interposed between the first and second coils 511 and 513, the intensity of the magnetic field sent to the wireless power receiver is increased, so that the power transmission efficiency can be significantly improved.

Further, in the wireless power device 500 according to the third embodiment, since at least two coils having the meander pattern are connected with each other in parallel, resistance components of the coils have the effects the same as those of a parallel-connection structure thereof, so that the quality factor Q can be greatly improved.

The embodiment is applicable to the wireless power transmitter or a wireless power receiver.

The invention claimed is:

1. A wireless power device comprising:
a first coil including a first sub-coil and a second sub-coil connected with the first sub-coil in parallel; and
a second coil connected with the first coil in parallel and including a first sub-coil and a second sub-coil connected with the first sub-coil in parallel,
wherein the first sub-coil of the first coil is connected with the first sub-coil of the second coil in parallel,
wherein the second sub-coil of the first coil is connected with the second sub-coil of the second coil in parallel,
wherein the first sub-coil of the second coil surrounds and is spaced apart from the first sub-coil of the first coil by a predetermined distance, and the second sub-coil of the second coil surrounds and is spaced apart from the second sub-coil of the first coil by the predetermined distance,
wherein the first sub-coil of the second coil and the first sub-coil of the first coil are arranged to be horizontally symmetrical with respect to the second sub-coil of the second coil and the second sub-coil of the first coil, and
wherein each coil has a meander pattern.

2. The wireless power device of claim 1, wherein the first and second sub-coils of the first coil have a closed-loop structure.

3. The wireless power device of claim 1, wherein the first and second sub-coils of the second coil have a closed-loop structure.

4. The wireless power device of claim 1, wherein the second coil surrounds the first coil.

5. The wireless power device of claim 1, wherein a curvature radius of the second coil is greater than a curvature radius of the first coil.

6. The wireless power device of claim 1, wherein the first coil has a spacing equal to a spacing of the second coil.

7. The wireless power device of claim 1, further comprising a capacitor connected with each of the coils to adjust a resonance frequency.

* * * * *